United States Patent [19]

Hrusch

[11] Patent Number: 4,552,324
[45] Date of Patent: Nov. 12, 1985

[54] LANDING GEAR MECHANISM FOR USE ON ROUGH RUNWAYS

[75] Inventor: Louis C. Hrusch, Chesterland, Ohio

[73] Assignee: Pneumo Corporation, Boston, Mass.

[21] Appl. No.: 499,217

[22] Filed: May 31, 1983

[51] Int. Cl.$^4$ ............................................. B64C 25/60
[52] U.S. Cl. ............................ 244/104 FP; 267/64.22; 188/285
[58] Field of Search ......... 244/103 R, 104 R, 104 FP; 267/64.11, 64.22; 188/282, 285

[56] References Cited

U.S. PATENT DOCUMENTS

| | | | |
|---|---|---|---|
| 2,077,934 | 4/1937 | Johnson | 244/104 FP |
| 2,451,171 | 10/1948 | Mullen | 267/64.22 |
| 2,814,482 | 11/1957 | Anderson et al. | 244/104 FP |
| 3,073,586 | 1/1963 | Hartel | 267/64.22 |
| 3,888,436 | 6/1975 | Sealey | 244/104 FP |
| 4,273,303 | 6/1981 | Somm | 244/104 FP |
| 4,291,850 | 9/1981 | Sharples | 244/104 FP |

Primary Examiner—Trygve M. Blix
Assistant Examiner—Rodney Corl
Attorney, Agent, or Firm—Renner, Otto, Boisselle & Lyon

[57] ABSTRACT

Landing gear mechanism includes a built-in hydraulic actuator which may be actuated to provide a heavy load range, soft spring rate during take-off with a heavy take-off weight and a lower load range, softer spring rate after take-off and prior to landing with a lighter landing weight to yield more shock strut stroke for a given range of vertical load during landing. A special taxi valve allows for some fluid to bypass the main orifice more freely to and from the lower piston damping chamber to the shock strut air-oil chamber as soon as the landing energy stroke is complete to greatly reduce or eliminate high damping loads that might otherwise take place as the gear negotiates bumps. Such a valve may automatically be set to close for landing by the action of the gear extension during a subsequent take-off, thus reactivating the main orifice. For normal bounce, air in the primary chamber drives oil through an orifice in a rebound damper valve to the lower piston chamber in order to lift the supported weight of the aircraft as part of the return stroke. However, when riding over a hole, the air acts freely on the differential or net piston area of the gear which area is too small to lift the supported weight of the aircraft, but is large enough to accelerate the unsprung mass of the gear quickly into the hole. An anti-cavitation bypass valve assures oil refill in the lower portion of the piston chamber as the gear extends. Also, a pressure actuated valve may be provided in the metering pin which, upon sensing cavitation in the lower piston chamber during extension, will open a series of holes both above and below the main orifice, providing a flow path for oil around the main orifice, to eliminate the aforementioned cavitation. The metering pin is part of this flow path. A check valve may be provided at the top of the metering pin to keep the metering pin full of oil by allowing free flow of oil upward but not allowing downward flow, thus preventing the intake and down flow of shock strut air during the anti-cavitation re-fill of the lower piston chamber. An extension snubber valve may also be provided to develop piston rebound damping during the last portion of stroke of the landing gear before full extension thereof during take-off.

66 Claims, 21 Drawing Figures

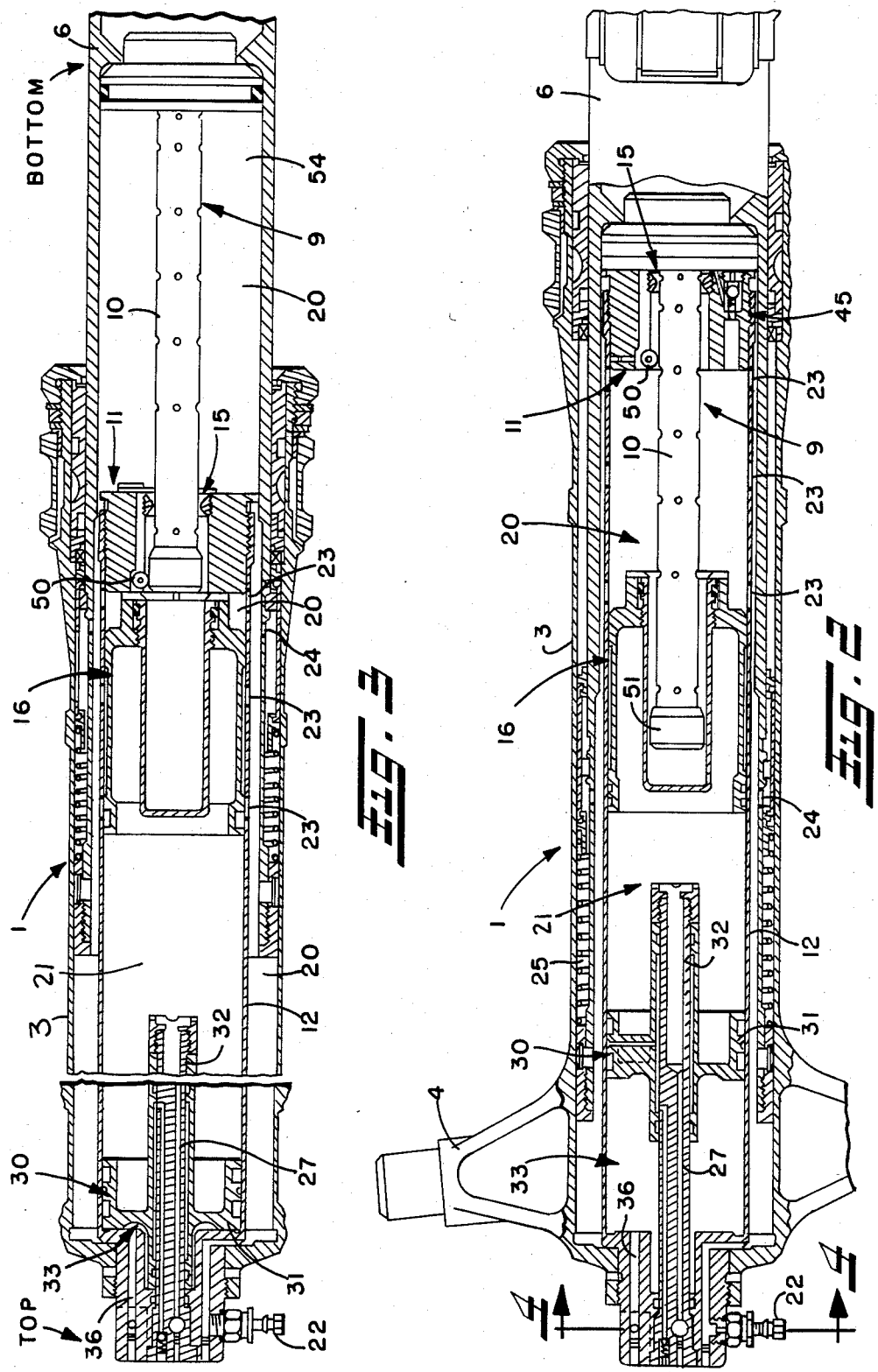

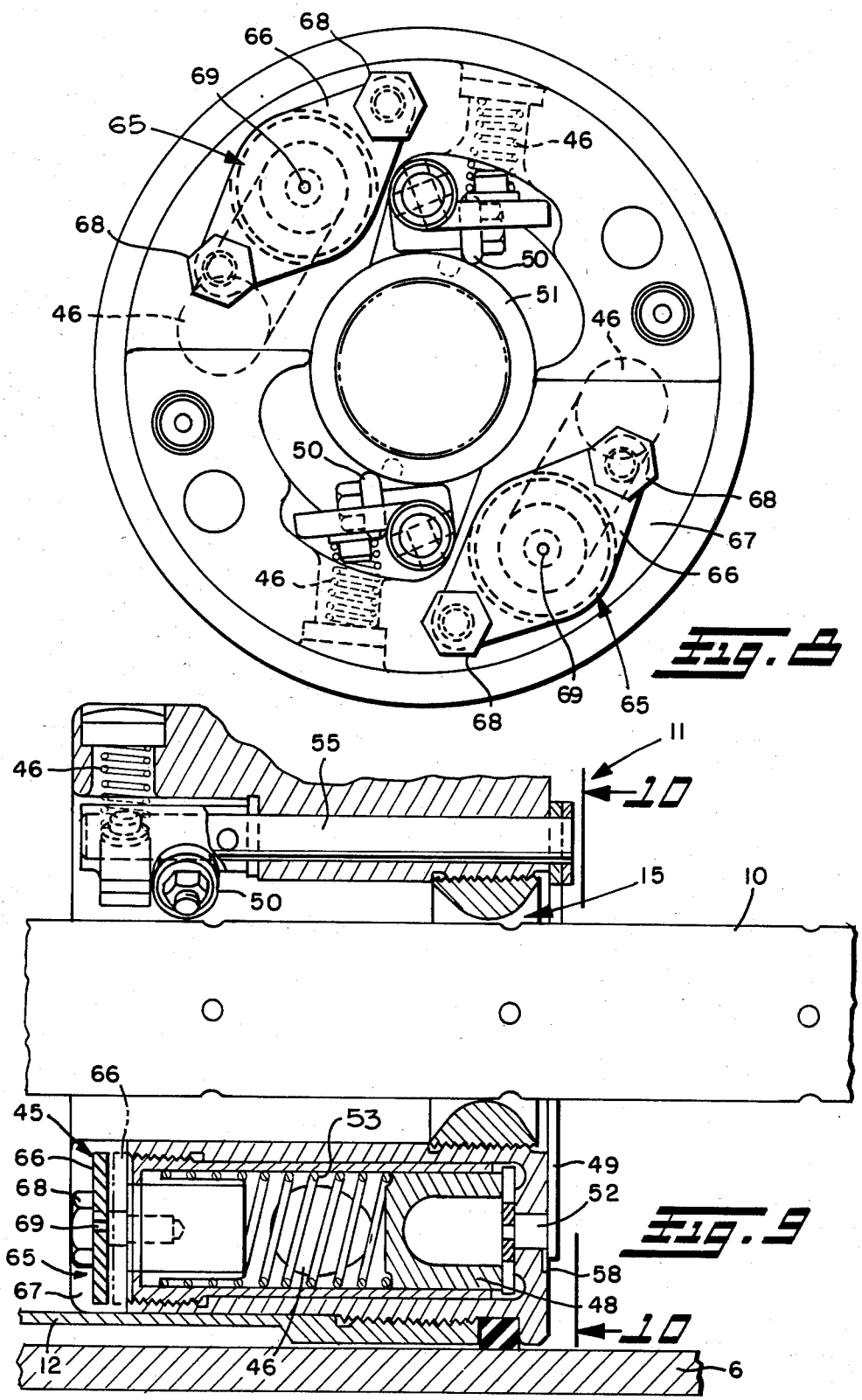

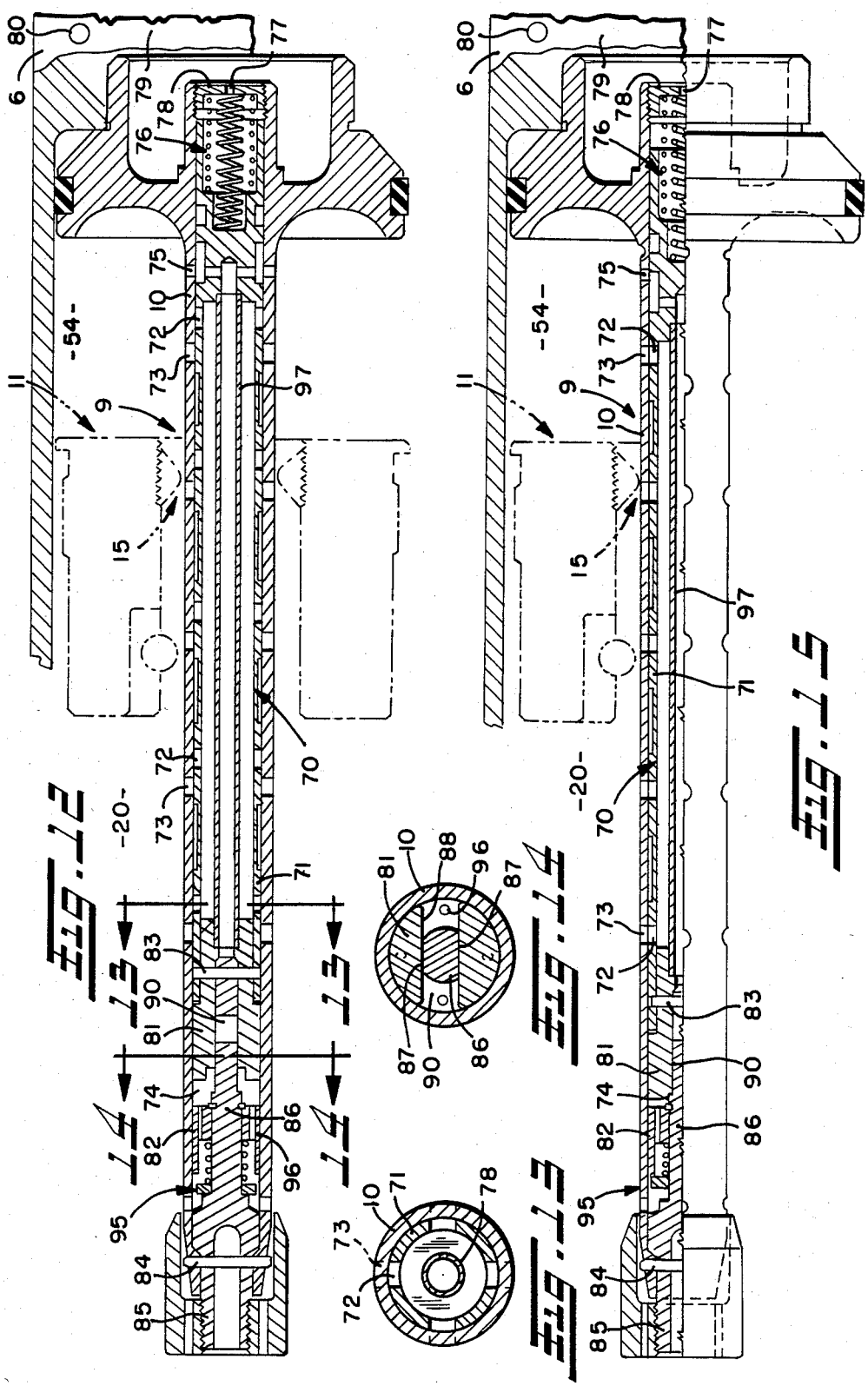

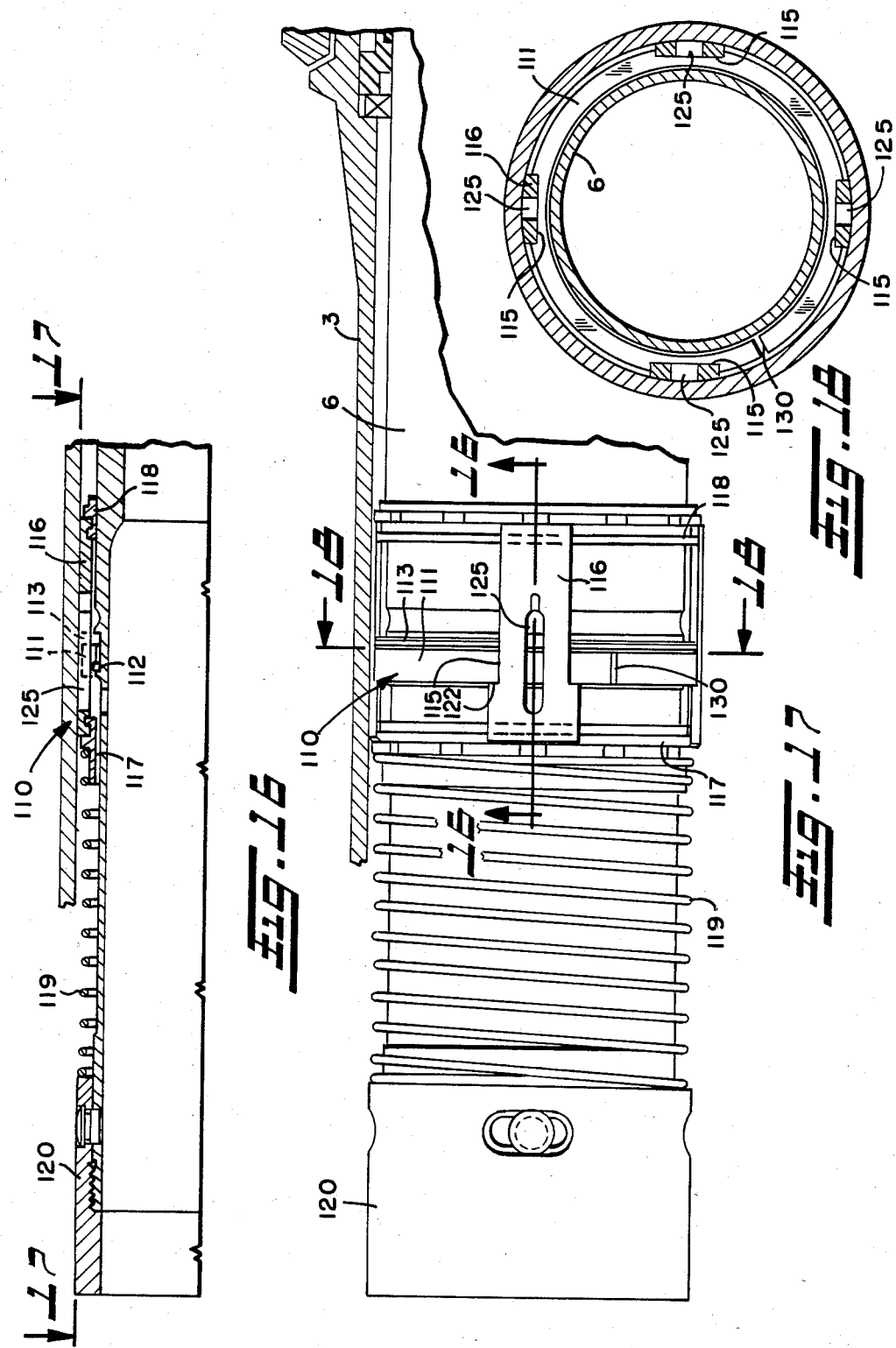

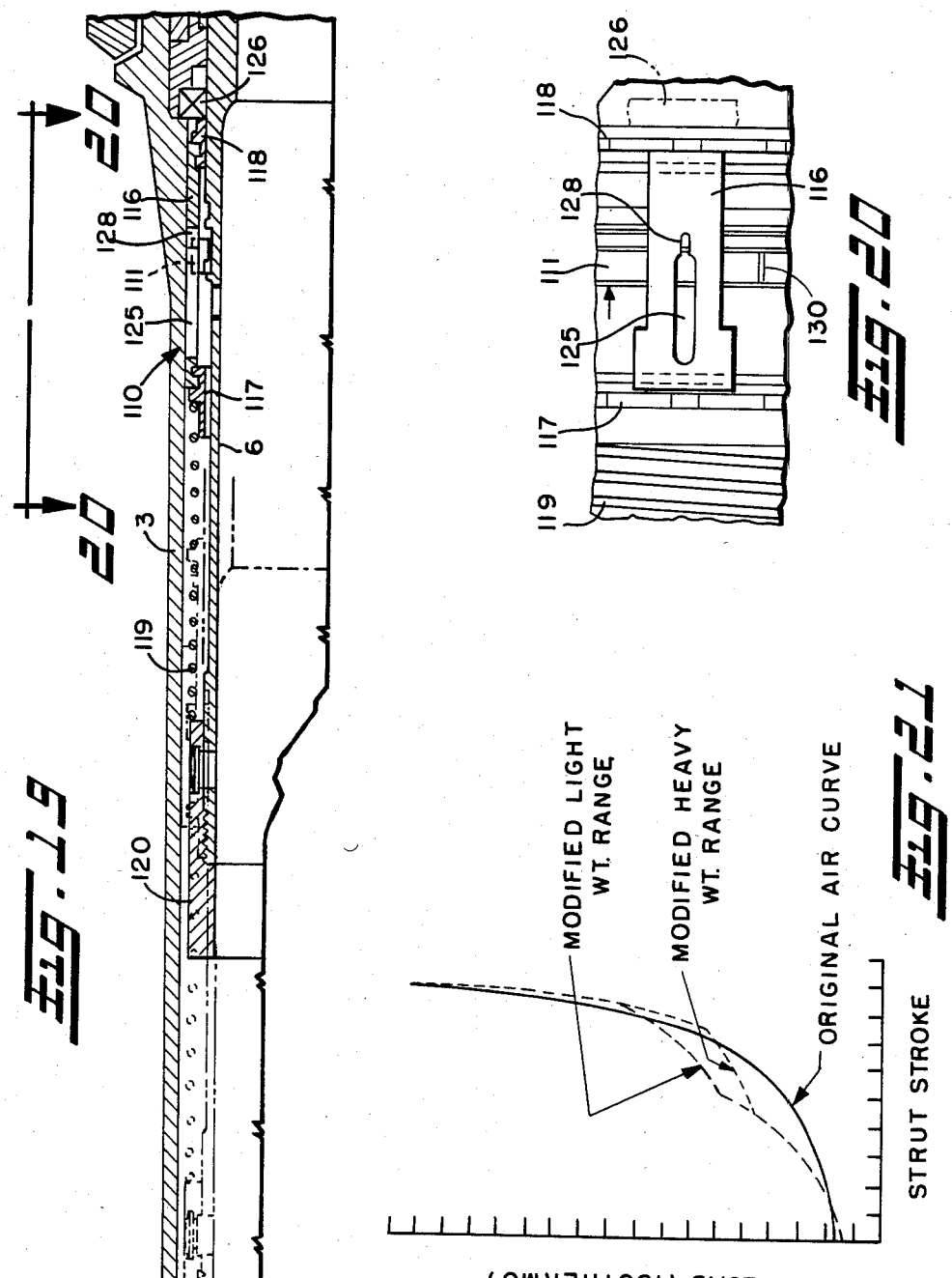

LANDING GEAR MECHANISM FOR USE ON ROUGH RUNWAYS

BACKGROUND OF THE INVENTION

The present invention relates generally as indicated to a landing gear mechanism which is especially adapted to permit high performance aircraft to operate on relatively rough runways.

Typically landing gears for high performance aircraft such as operated by the military are not designed to operate on rough runways made rough, for example, as a result of temporary repairs to bomb damaged areas and the like. If such an aircraft were to land on a rough runway, considerable damage and possible collapse of the landing gear could be incurred either during landing or as a result of the aircraft rolling over the rough runway surface.

One reason why rough runways are so potentially damaging to the landing gear of high performance military aircraft is that in order for the gear to be effective at heavy take-off weight, the shock strut stroke of the gear during landing may not be adequate to absorb the required amount of landing energy to prevent damage to the gear when landing on rough runways. Also, after the landing emergy stroke is complete, high damping loads may take place as the landing gear strut negotiates bumps.

High stresses on the landing gear will also result when the tires fall into holes or depressions in the runway. Moreover, if the gear should extend or compress too quickly, undesirable cavitation may occur during such movement.

SUMMARY OF THE INVENTION

With the foregoing in mind, it is a principal object of this invention to provide an improved landing gear mechanism which has two low spring rate load ranges, a heavy range for effective operation at heavy take-off weight and a softer range to yield more shock strut stroke for a given range of vertical load during landing.

Another object is to provide such a landing gear mechanism which substantially reduces or eliminates high damping loads as the landing gear negotiates bumps.

Still another object is to provide such a landing gear mechanism which can discriminate between shock strut extension during normal ground roll and extension as the strut tire follows a sudden recess during forward travel.

Another object is to provide such a landing gear mechanism which prevents cavitation in the lower piston chamber of the gear as the gear extends.

A further object is to provide such a landing gear mechanism which provides for piston rebound damping as the piston approaches the end of its stroke before full extension.

Still another object is to provide such a landing gear mechanism of the type described which can readily be incorporated within the envelope of a standard landing gear.

These and other objects of the present invention may be achieved by providing the landing gear mechanism with a built-in hydraulic actuator which may be actuated to provide a relatively heavy spring load range during take-off with a heavy take-off weight and a softer spring load range after take-off and prior to landing with a lighter landing weight to yield more shock strut stroke for a given range of vertical load during landing. A metering pin orifice mechanism controls the rate of damping of the gear as it is being compressed while landing is taking place. However, as soon as the landing energy stroke is complete, a taxi instroke bypass valve is permitted to open to allow fluid to pass more freely from the lower piston chamber to the primary piston chamber, bypassing the orifice, to greatly reduce or eliminate high damping loads that might otherwise take place as the gear negotiates bumps. Such valve may automatically be set to quickly close for landing by the action of the gear extension during a subsequent take-off.

Also in accordance with the invention, a rebound damper valve assembly is desirably provided which can discriminate between shock strut extension during normal ground roll and extension as the strut tire follows a sudden recess during forward travel. For normal bounce the landing gear mechanism will force the air to drive oil through an orifice in the rebound damper valve in order to lift the supported weight of the aircraft as part of the return stroke. However, when riding over a hole, the strut air acts freely on the differential or net piston area of the strut (O.D. minus I.D.) which area is too small to lift the supported weight of the aircraft, but is large enough to accelerate the unsprung mass of the landing gear, piston, tire, wheel, etc. quickly into the hole.

Further in accordance with the invention, an anti-cavitation bypass valve is desirably provided to assure oil refill in the lower portion of the piston chamber as the gear extends. The valve is driven open by a spring when the lower piston pressure drops below a predetermined level such as 225 psig, which would indicate possible cavitation, and remains open allowing free flow of oil past the main orifice and into the lower piston chamber until the lower piston pressure once again reaches a sufficient pressure to shut the valve off.

Still further in accordance with the invention, a pressure actuated spring return check valve may be provided in the upper end of the metering pin. Such check valve closes at the very start of extension of the strut tire into a recess to keep oil inside the metering pin. During compression of the strut, the check valve opens to allow free flow of oil through the center of the metering pin during such compression.

Also in accordance with the invention, the aforementioned return check valve prevents the unwanted ingestion of shock strut air during the anti-cavitation refill of the lower piston chamber.

Further in accordance with the invention, an extension snubber valve may be provided in an annular chamber between the main piston O.D. and main cylinder I.D. to develop piston rebound damping during the last portion of the stroke of the landing gear before full extension thereof during take-off.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 2 is a fragmentary longitudinal section through such landing gear mechanism shown in the static loaded position;

FIG. 3 is a fragmentary longitudinal section through the landing gear mechanism similar to FIG. 2 but shown fully extended;

FIG. 8 is a top end view of the assembly of FIG. 5 as seen from the plane of the line 8—8 thereof;

FIG. 9 is a fragmentary longitudinal section similar to FIG. 5 but showing the taxi instroke bypass valve assembly in its operative position after landing, when the gear is in the static or two inches from the fully extended position;

FIG. 12 is an enlarged fragmentary longitudinal section through the metering pin assembly and anti-cavitation mechanism contained therewithin, such anti-cavitation mechanism being shown in its inoperative position;

FIGS. 13 and 14 are transverse sections through the metering pin assembly and anti-cavitation mechanism of FIG. 12, taken along the plane of the lines 13—13 and 14—14, respectively;

FIG. 15 is an enlarged fragmentary longitudinal section similar to FIG. 12 but showing the anti-cavitation mechanism in its operative position;

FIG. 16 is an enlarged fragmentary longitudinal section through the rebound damper mechanism of such landing gear mechanism, such rebound damper mechanism being shown in its non-damping mode;

FIG. 17 is a fragmentary top plan view of the rebound damper mechanism of FIG. 16 as generally seen from the plane of the line 17—17 thereof;

FIG. 18 is an enlarged transverse section through the rebound damper mechanism of FIG. 17, taken on the plane of the line 18—18 thereof;

FIG. 19 is an enlarged fragmentary longitudinal section through the rebound damper mechanism, similar to FIG. 16, but showing the rebound damper mechanism in its damping mode near the end of the extension stroke of the gear before full extension thereof;

FIG. 20 is a fragmentary top plan view of the rebound damper mechanism shown in FIG. 19 as generally seen from the plane of the line 20—20 thereof; and FIG. 21 is graphical illustration showing how the original air curve of a conventional landing gear mechanism is changed when modified to include an actuator mechanism in accordance with the present invention.

DETAILED DESCRIPTION OF THE PREFERRED EMBODIMENT

Figure 1:
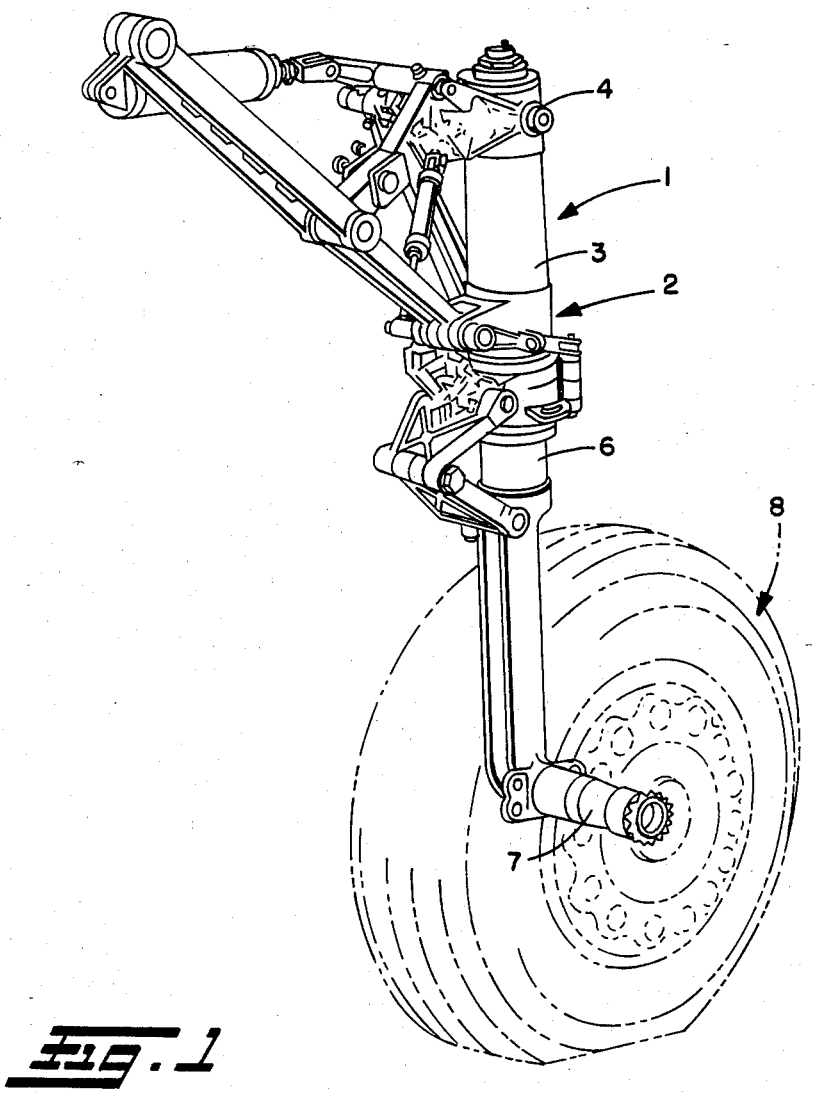
FIG. 1 is an isometric view of one type of landing gear mechanism which has been modified in accordance with the present invention to permit operation on rough runways.

Referring now in detail to the drawings, and initially to FIG. 1 thereof, one type of landing gear mechanism which has been modified in accordance with the present invention to permit operation on rough runways is generally indicated by the reference numeral 1. The particular landing gear mechanism shown is the main landing gear used on one type of high performance military aircraft. However, it should be understood that similar modifications could be made to the landing gears for other high performance aircraft as well as transport or other utility types of aircraft.

The landing gear mechanism 1 shown consists of a main shock strut 2 including an outer main cylinder 3 having a trunnion 4 at its upper end for connection to the aircraft fuselage in conventional manner. Suitable support struts and drag brace members are provided for supporting the landing gear in its down position for supporting the aircraft while on the ground and during take-off and landing and for retracting the gear during flight. Axially movable within the cylinder 3 is a main strut piston 6 which extends downwardly and outwardly therefrom and has an axle spindle 7 at the outer end thereof for mounting of a wheel and tire assembly 8 thereon.

As can readily be seen in FIGS. 2 and 3, the main piston 6 is generally tubular over its retracted length, and contains a metering pin assembly 9 for controlling the rate of retraction of the main piston during landing of the aircraft. The metering pin assembly 9 is connected to the main piston for movement therewith, and includes a metering pin 10 which extends through a restrictor orifice assembly 11 mounted within the outboard end of an orifice support tube 12. The orifice support tube is in turn connected at its inboard end to the main cylinder 3 and extends into the main piston 6 over a substantial portion of the length of the main cylinder. By controlling the taper of the metering pin 10 in relation to the size of an orifice 15 in the restrictor orifice assembly 11 through which the metering pin assembly extends, the dynamic load stroke curve of the landing gear can be controlled within certain limits at different strut-stroke positions, as well known in the art.

Also, it is known to provide a secondary piston 16 intermediate the ends of the orifice support tube 12 to divide the orifice support tube into a primary chamber 20 and a secondary chamber 21 to permit further refinements to the load stroke air curve of the landing gear.

Figure 4:
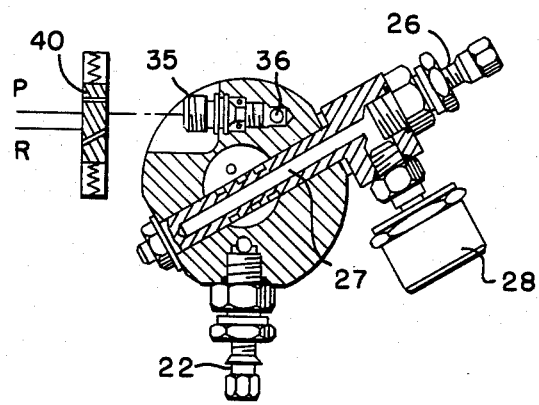
FIG. 4 is an enlarged transverse section through the valving at the inboard end of the landing gear mechanism used to service the landing gear mechanism, taken on the plane of the line 4—4 of FIG. 2.

Typically, to service the gear, the main cylinder 3 is first filled with oil to the desired level through a primary service valve 22 at the inboard end of the main cylinder (see FIGS. 2-4). Then the primary chamber 20 is charged with air through the same valve 22 until the air pressure within the primary chamber reaches a predetermined level, for example, 700 psi. Suitable openings 23, 24 may be provided in the orifice support tube 12 and main piston 6 for passage of oil and air into the primary chamber 20 and fluid chamber 25 between the main cylinder 3 and main piston 6. Next the secondary chamber 21 is charged with air through a secondary service valve 26 and associated passage 27 until the gear is extended to the desired length. A gauge assembly 28 may be connected to the passage 27 as shown in FIG. 4 for measuring the air pressure in the secondary chamber.

The amount of secondary air required to achieve the desired extension of the gear will vary depending upon the weight of the aircraft prior to take-off. In the usual case, the take-off weight of a military aircraft is substantially greater than its landing weight. Indeed, the landing gears for most high performance military aircraft are not designed to support the landing weight of the aircraft when fully loaded. Accordingly, it is common practice for high performance military aircraft to dump unused stores and/or any excess fuel prior to landing.

Heretofore, it has only been possible to adjust the load setting of the landing gear during servicing while the aircraft is on the ground by controlling the amount of oil and air that is put into the main cylinder and primary and secondary chambers during servicing. Since the optimum load setting for the gear for a heavy take-off weight is different than the optimum load setting for a lighter landing weight, standard practice has been to compromise the load setting somewhere between the optimums for take-off and landing.

However, it has been found that if the gear is provided with a hydraulic actuator 30 in accordance with the present invention, the gear can be made to accommodate two or more different aircraft weights so that the gear is effective at both a heavy take-off weight and at a lighter landing weight. As can be seen in FIGS. 2 and 3, such hydraulic actuator is desirably built into the landing gear and comprises a hydraulic piston 31 axially movable within the orifice support tube 12 intermediate the inboard end thereof and the secondary piston 16. The hydraulic piston is desirably supported for axial movement within the orifice support tube by a piston stem 32 which extends axially into the orifice support tube from the outboard end thereof. The outboard side of the hydraulic piston is exposed to the secondary air in the secondary chamber 21, whereas the inboard side of the hydraulic piston and inboard end of the orifice support tube define therebetween a hydraulic chamber 33 for hydraulic oil. As will be apparent from the discussion which follows, such a built-in hydraulic actuator may be effectively utilized to provide two or more static system stroke ranges for the gear, one stroke range based on the take-off weight, and one or more different stroke ranges based on the landing weight. FIG. 21 shows the resulting effect on the load stroke curve of the landing gear mechanism when modified to include the actuator mechanism of the present invention, wherein the heavy weight and light weight static positions of the modified landing gear mechanism are clearly defined.

Servicing of a gear including such a built-in hydraulic actuator 30 is conventional except that the hydraulic chamber 33 is also charged with hydraulic oil through a hydraulic chamber connection 35 and associated passage 36 in the inboard end of the main cylinder 3 during servicing. This initial servicing establishes the heavy load setting (static loaded position) of the gear shown in FIG. 2 prior to take-off. After take-off, with the gear fully extended, all or a portion of the hydraulic oil can be exhausted from the hydraulic chamber 33 as shown in FIG. 3 to establish a lighter load setting for the gear as by shuttling a valve 40 connected to the hydraulic chamber connection 35 (see FIG. 4) which causes the hydraulic piston 31 to move to the left as shown in FIG. 3. This lighter load setting of the gear may be manually controlled or automatic in the sense that after a suitable time delay or when the pilot pushes the gear lever to the down position (after take-off and just prior to landing) the valving 40 may be automatically moved to a position communicating the hydraulic chamber 33 with a reservoir to permit the hydraulic piston 31 to move to the left to the lighter load position as aforesaid in preparation for landing, possibly with a pilot override if necessary. Also, a suitable feed-back mechanism (not shown) may be employed to locate the hydraulic piston 31 at additional intermediate positions, allowing the pilot to dial in any intermediate setting, in order to obtain any number of different static weight conditions, instead of merely two such positions as shown in FIG. 21. Changing the location of the hydraulic piston 31 within the gear permits optimization of the air curve or spring rate of the gear for both heavy take-off weights and lighter landing weights.

Another objection to conventional landing gears for high performance military aircraft is that if the aircraft were required to operate on rough runways, the damping loads that occur as the gear negotiates bumps might be much higher than desired, and could cause structrual damage and possible collapse of the gear. A gear when modified according to the present invention, however, will greatly reduce or substantially eliminate such high damping loads, thus making operation of the gear possible on rough runways. Briefly, this is accomplished by providing the gear with a taxi instroke bypass valve assembly 45, shown in FIGS. 2 and 5–11, which opens one or more bypass passages 46 around the orifice 15 between the metering pin 10 and restrictor orifice assembly 11 as soon as pressure equilibrium is obtained within the gear after landing to permit sudden compression of the gear for faster, lesser damped, instroke as necessitated by the gear going over such bumps.

As can be seen in FIGS. 5–11, the taxi instroke bypass valve assembly 45 is desirably incorporated within the restrictor orifice assembly 11 and consists of one or more two-position pressure actuated valves 48 and rotary valve vanes 49. In the preferred form of the invention shown herein, there are two such valves 48 and associated rotary valve vanes 49 located at the lower end of the support tube 12, each spaced 180° apart.

When the gear is fully extended prior to landing as shown in FIG. 3, the rotary valve vanes 49 are mechanically actuated by engagement of respective rollers 50 with a ramp 51 on the upper or inboard end of the metering pin 10 to close the by-pass passages 46 and open the ports 52 to the valves 48 exposing the valves to the hydraulic oil in the lower chamber 54 of the main piston 6. This causes the valves 48 to move inwardly against the bias of valve springs 53 to the position shown in solid lines in FIGS. 5 and 7 also blocking fluid flow through the bypass passages 46. Accordingly, during landing, all of the hydraulic fluid must pass from the lower piston chamber 54 up to the primary chamber 20 through the landing energy orifice 15, giving full orifice landing dynamics to the gear during landing.

Figure 5:
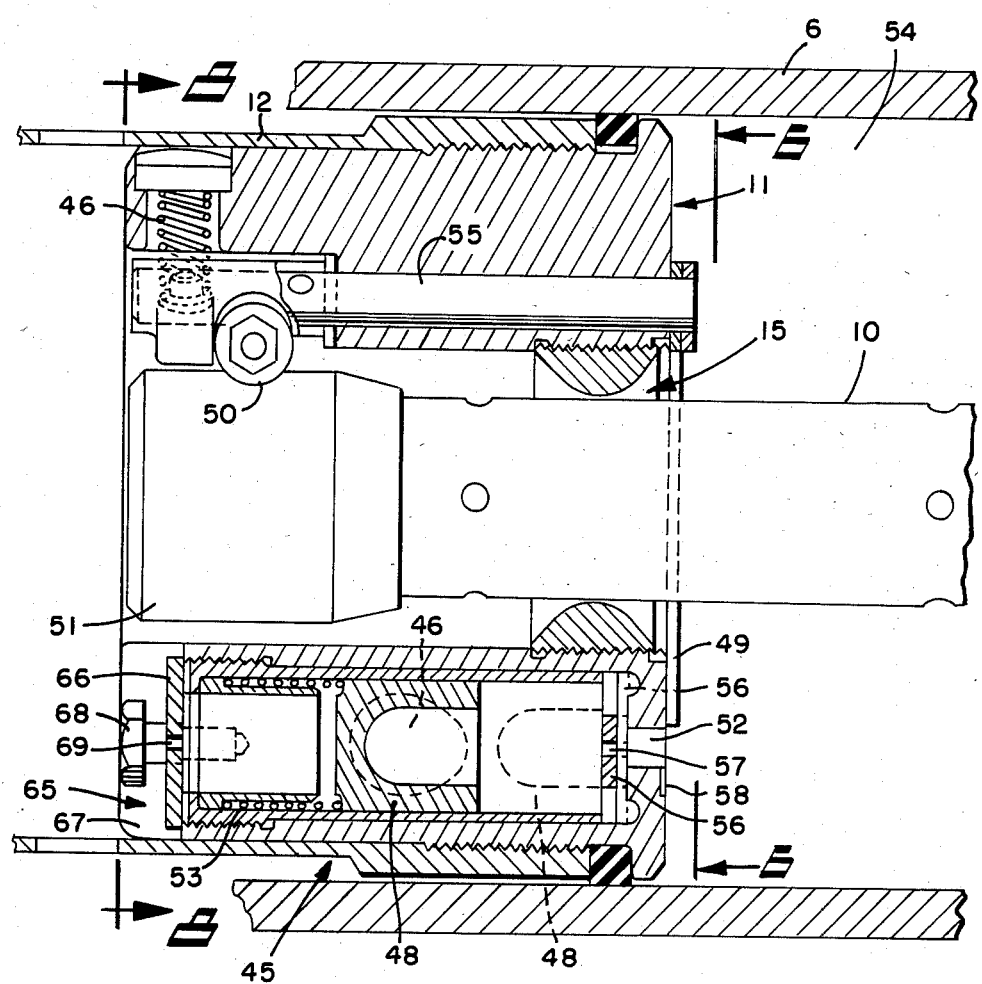
FIG. 5 is an enlarged fragmentary longitudinal section through the restrictor orifice assembly and taxi instroke bypass valve assembly and rebound flapper valve assembly for such landing gear mechanism, such taxi instroke bypass valve assembly being shown in its inoperative position when the gear is fully extended prior to landing.
Figure 6:
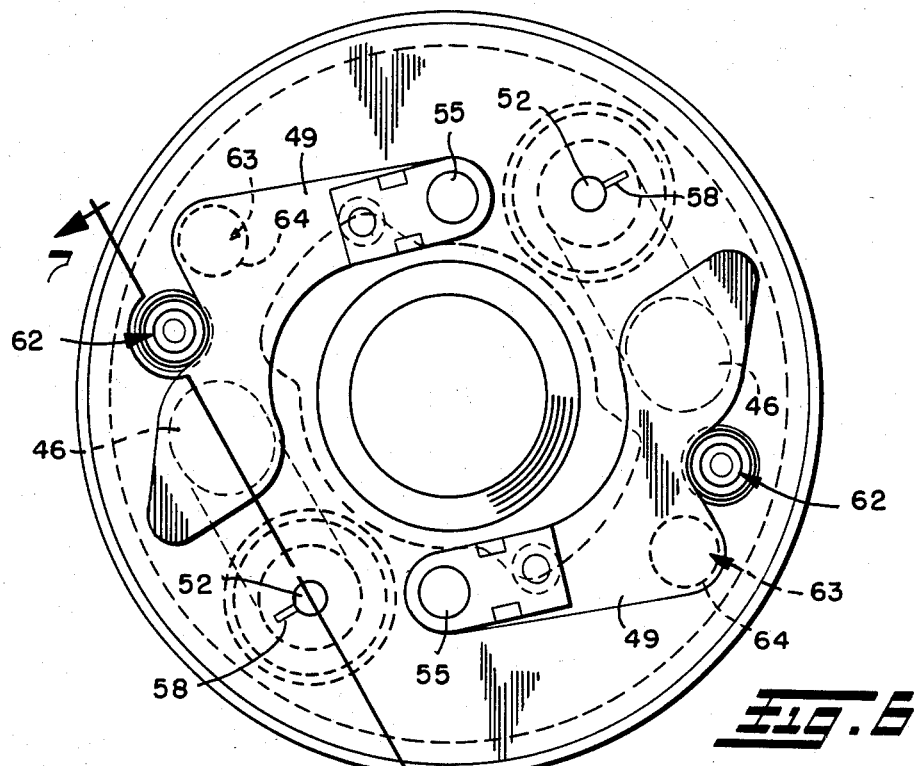
FIG. 6 is a lower end view of the assembly of FIG. 5 as seen from the plane of the line 6—6 thereof.
Figure 7:
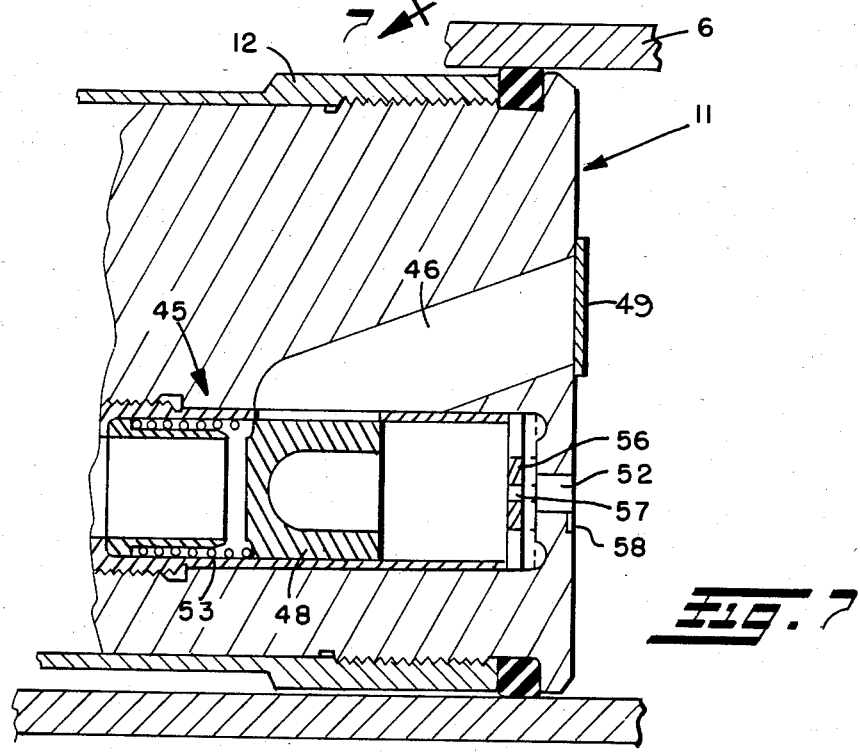
FIG. 7 is an enlarged longitudinal section through one of the bypass passages and check valves of the taxi instroke bypass valve assembly, taken along the plane of the line 7—7 of FIG. 6.

The rollers 50 are connected to respective shafts 55 in radially offset relation from their respective axial centers, whereby when the rollers 50 engage the ramp 51, the shafts are caused to rotate, thus rotating the rotary vanes 49 which are attached to the outboard ends thereof to the position shown in FIGS. 5–7 closing the bypass passages 46 and opening the valve ports 52 as aforesaid.

A restrictor plate 56 may be provided in each valve port 52 to cause a short time delay in moving the valves 48 to the FIGS. 5 and 7 position blocking fluid flow through the bypass passages 46 after the valve ports have been opened. As shown in phantom lines in FIG. 5, when the valves 48 and restrictor plates 56 are fully seated against the inner ends of the valve ports 52, the area of the restrictor plates 56 exposed to the fluid pressure in the valve ports is not sufficient to overcome the bias of the valve springs 53 and fluid pressure acting on the valves 48 opposing such movement. Not until sufficient hydraulic fluid passes through a central orifice 57 in each of the restrictor plates 56 to act on the larger surface area of the associated pressure actuated valve 48 will the valves 48 begin to move to the solid line position shown in FIGS. 5 and 7. As soon as the valves 48 commence such movement, the restrictor plates 56 will also move away from the valve ports 52 to allow fluid pressure to act on the entire exposed area of the restrictor plates and valves 48 thus requiring less fluid pressure to maintain the valves in such solid line position.

Figure 10:
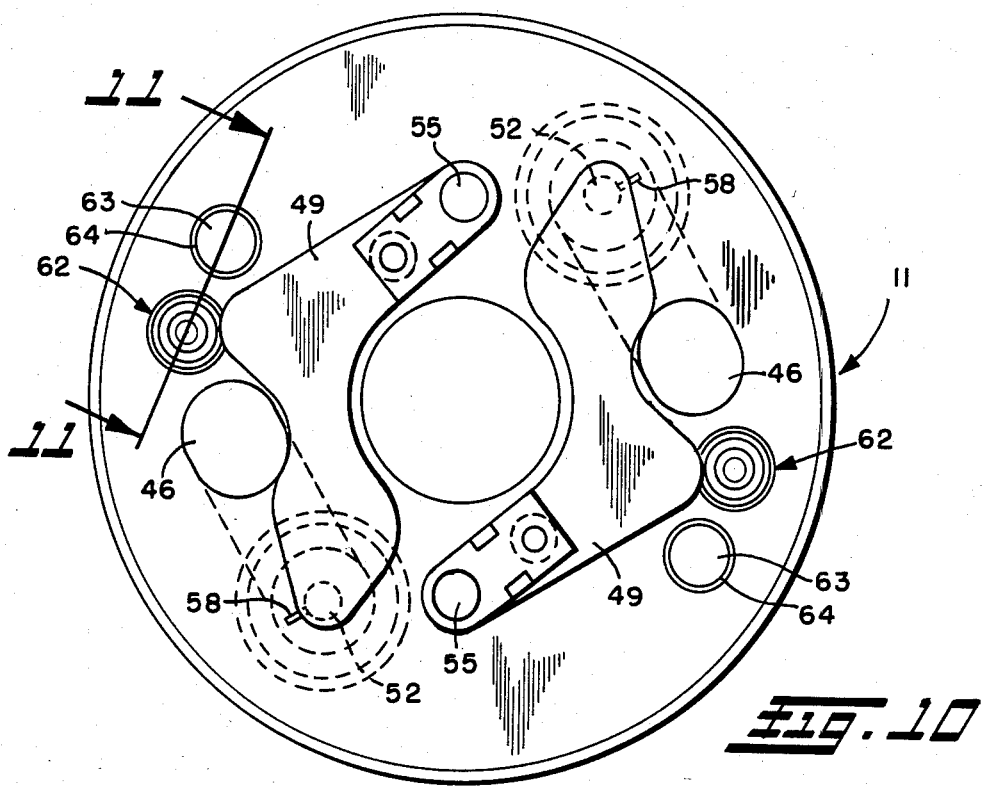
FIG. 10 is a bottom end view of the assembly of FIG. 9 as seen from the plane of the line 10—10 thereof.
Figure 11:
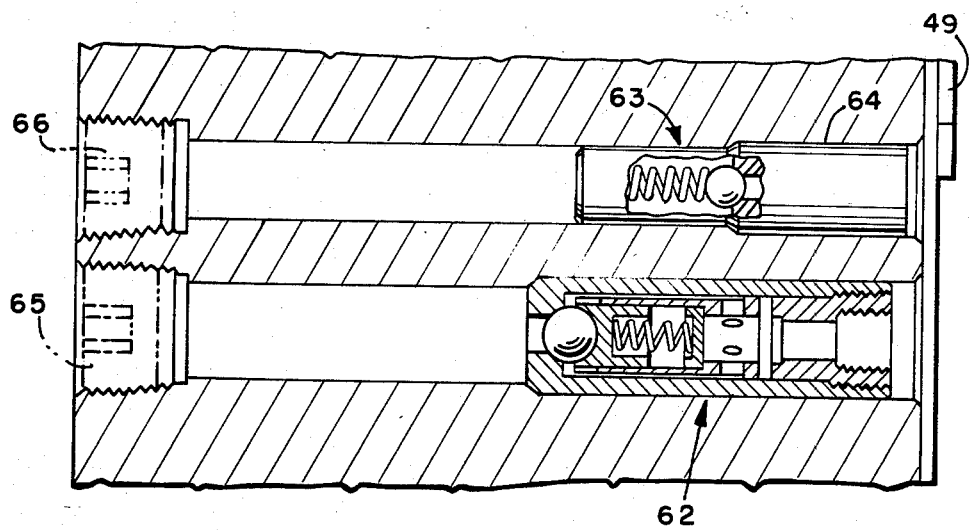
FIG. 11 is a fragmentary longitudinal section through a check valve assembly and relief valve assembly incorporated in the restrictor orifice assembly, taken generally along the plane of the line 11—11 of FIG. 10.

After landing, when the gear is in the static or two inches from the fully extended position shown in FIG. 3, the ramp 51 moves axially out of engagement with the trigger rollers 50, whereby the rollers are caused to move into engagement with the O.D. of the metering pin 10 due to the force of axial compression springs 46 acting on the rollers, which causes the shafts 55 connected thereto to rotate the rotary valve vane 49 to move to the position shown in FIGS. 9 and 10 to open the bypass passages 46 and close the valve ports 52. The valve springs 53 then cause the valves 48 to move toward the valve ports 52 to open the bypass passages 46 as soon as pressure equilibrium is obtained on opposite sides of the valves after landing. One or more radial slots 58 extend radially outwardly from the valve ports 52 beyond the rotary valve vanes 49 when the rotary valve vanes are in the position shown in FIGS. 9 and 10 closing the valve ports 52 to allow for restricted flow of recess hydraulic oil from the valve ports during such outward movement of the valves.

When the bypass passages 46 are open, the bypass passages allow more oil to flow around the metering orifice 15 for sudden compression of the gear to reduce the restriction instroke while taxiing on rough fields, for faster instroke of the gear if necessary.

During take-off, as the gear approaches its fully extended position (i.e., within approximately two inches from its fully extended position) the ramp 51 located at the upper end of the metering pin 10 engages the trigger rollers 50 which causes the shafts 55 connected thereto to rotate the rotary valve vanes 49 to close the bypass passages 46 and open the valve ports 52 so that the valves 48 will also move to close the bypass passages. Thus, once again the bypass passages are shut when the gear is fully extended to give full orifice landing dynamics to the gear as aforesaid.

A rebound flapper valve assembly 65 may also optionally be provided at the inner end of each bypass passage 46 on the upper end of the restrictor orifice assembly 11 opposite the rotary vane valves 49. Each rebound flapper valve assembly desirably consists of a flat flapper valve plate 66 attached to the upper end of the restrictor orifice assembly housing 67 as by means of a pair of shoulder bolts 68 which permit limited movement of the valve plates between the closed position shown in FIG. 5 and the open position shown in FIG. 9. Such limited movement of the flapper valve plates 66 permits the valve plates to be pushed to the open position shown in FIG. 9 during instroke movements of the gear while taxiing, whereby the valve plates are effectively removed during the instroke so that there is no damping caused by the rebound flapper valves during such instroke. However, the rebound flapper valves will dampen the outstroke of a weighted gear for normal bounce during taxiing, in that the return flow rate through the bypass passages 46 causes a suction which closes the flapper valve plates against the passage as shown in phantom lines in FIG. 9, thus requiring the air pressure in the primary chamber 20 to drive the oil through a restricted flow passage consisting of a small hole 69 in the center of the flapper valves in order to lift the supported weight of the aircraft as part of the return stroke.

At the same time, if the wheel and tire assembly 8 should ride over a hole, the pressurized air in the primary chamber 20 can still act freely on the net exposed area of the main piston 6 between the main cylinder 3 and orifice support tube 12 (O.D. minus I.D.) to accelerate the upsprung mass of the gear quickly into the hole. The area of the piston 6 exposed to such air in the primary chamber is too small to lift the supported weight of the aircraft but is easily large enough to accelerate the unsprung mass quickly into the hole as aforesaid.

One or more check valves 62 may optionally be provided in the restrictor orifice assembly 11 to supplement the oil flow from the primary chamber 20 to the lower piston chamber 54 during the outstroke of the gear if needed. Also one or more overload relief valves 63 may optionally by provided in the restrictor orifice assembly to relieve excess oil pressure from the lower piston chamber to the primary chamber in the event that an overpressure condition should develop during the taxi mode when the gear is being compressed. During the landing mode, the passage 64 leading to the overload relief valves 63 are closed by the rotary valve vanes 49 as shown in FIG. 6 to ensure that the overload relief valves will not operate during the landing mode. Suitable plugs 65, 66, shown in phantom lines in FIG. 11, may be inserted into the passages for either or both of the check valves 62 and relief valves 63 to make them completely inactive if desired.

Referring next to FIGS. 12–14, an anti-cavitation mechanism 70 is also desirably incorporated into the metering pin assembly 9 to assure oil refill in the lower piston chamber 54 during sudden extension of the gear caused by the air pressure in the primary chamber 20 acting on the exposed main piston area 6 between the main cylinder 3 and orifice support tube 12 (see FIGS. 2 and 3) as the wheel and tire assembly 8 negotiates a dip or depression. The anti-cavitation mechanism shown comprises a bypass sleeve valve 71 axially movable within the metering pin 10. The bypass sleeve valve has a series of longitudinally spaced holes 72 therein which when brought into alignment with equally spaced holes 73 in the metering pin 10 allow for the flow of oil through the internal sleeve valve 71 around the metering orifice 15 to supplement the oil flow therethrough. However, as long as the internal piston pressure within the lower piston chamber 54 is above a predetermined level, for example, 225 psig, the pressure acting on the differential area of the internal sleeve valve 71 through a pressure sensing orifice 75 in the metering pin will overcome the bias of a spring 76 acting on the lower end of the sleeve valve to move the sleeve valve to the position shown in FIGS. 12 and 13 in which the holes 72 therein are out of alignment with the holes 73 in the metering pin, thus blocking such holes.

The pressure sensing orifice 75 is connected to a chamber 74 adjacent the upper (left) end of the internal sleeve valve 71 via a hollow tube 97 therein extending substantially the entire length of such bypass sleeve valve. When the internal piston pressure in the chamber 54 below the metering orifice 15 drops below such predetermined gauge pressure, the pressure in chamber 74 correspondingly drops, whereby the pressure acting on the entire sleeve assembly can no longer keep the spring 76 compressed. Accordingly, the entire sleeve assembly is moved upwardly by the spring 76 to bring the bypass holes 72 in the internal sleeve valve 71 into alignment with the bypass holes 73 in the metering pin 10 as shown in FIG. 15 to supplement the oil flow through the orifice 15 to prevent cavitation in the chamber 54 during extension of the gear. As the pressure in the chamber 54 builds up (above 225 psig), once again the pressure in the chamber 74 acting on the entire sleeve assembly will overcome the force of the spring 76 to close off the bypass holes 73 in the metering pin 10. The lower end of the sleeve valve is exposed to the atmosphere through a slot 77 in a spring retainer 78 and a surrounding manifold assembly 79 in the main piston which has one or more vent passages 80 therein.

Axial upward movement of the bypass sleeve valve 71 is limited by engagement of a bushing 81 on the upper end of the sleeve valve with a stop 82 within the metering pin 10. When the bushing 81 is urged into engagement with the stop 82 by the spring 76 (a movement of approximately ¼ inch), the holes 72, 73 will be in axial alignment with each other as shown in FIG. 15 as aforesaid. Circumferential alignment of the holes 72, 73 is maintained as by providing a pin connection 83 between the bypass sleeve valve 71 and bushing 81 and another pin connection 84 between the metering pin 10 and a shaft member 85. The shaft member 85 has an extension 86 thereon with flats 87 on opposite sides thereof in sliding engagement with the opposite sides 88 of a slot 90 in the bushing (see FIG. 14).

A pressure actuated spring return check valve 95 is also desirably located at the upper end of the metering pin 10. During compression of the gear, the check valve 95 is open as shown in FIG. 12 thus allowing free flow of oil inward through the center of the metering pin via longitudinal passages 96 in the stop 82 and the slot 90 in the bushing 81 around the sides of the extension 86, such oil having come inward through the hollow tube 97 extending through the bypass sleeve valve 71 and communicating with the pressure sensing orifice 75 at the lower end thereof. However, whenever the gear (wheel and tire assembly) starts to extend into a recess or the like, the pressure above the orifice 15 is higher than the lower chamber 54 pressure. Accordingly, the check valve 95 immediately closes as shown in FIG. 15 to keep oil inside the metering pin and prevent trapped gas vapors from leaving the cavity immediately above the metering pin during sudden outstroke of the piston. Thus, such check valve prevents the unwanted ingestion of shock strut air during the anti-cavitation refill of the lower piston chamber.

A rebound damper mechanism 110 (shown generally in FIGS. 2 and 3 and in greater detail in FIGS. 16-20) may be provided in the annular chamber 25 between the O.D. of the main piston 6 and the I.D. of the main cylinder 3 which operates on sudden free extension of the gear during take-off to slow the extension of the gear to reduce shock as the gear reaches its fully extended position. Such rebound damper mechanism desirably consists of a retaining ring 111 suitably attached to the O.D. of the main piston 6 for movement therewith as by means of a lock ring 112 and recoil valve ring 113.

The retaining ring 111 has a plurality of circumferentially spaced longitudinal grooves 115 in the outer surface thereof. Preferably there are four such grooves equally spaced around the periphery of the retaining ring as shown in FIG. 17. Within each groove is a snubber plate 116 supported at its opposite ends as by upper and lower snubber rings 117, 118 which permit limited sliding movement of the snubber plates 116 relative to the main piston 6 and retaining ring 111 attached thereto. Each of the snubber plates has a pair of stop shoulders 122 upwardly of the retaining ring 111 which are normally biased into engagement with the retaining ring by a spring 119 interposed between the piston head 120 and the upper snubber ring 117 as shown in FIGS. 16 and 17. When in such position, the snubber plates 116 permit free flow of oil from one side of the retaining ring 111 to the other through longitudinally extending slots 125 in the snubber plates which have a length greater than the grooves 115 in the retaining ring as clearly shown in FIG. 17.

However, during the last several inches of extension stroke of the gear before full extension thereof, the lower snubber ring 118 engages a bearing 126 adjacent the outboard end of the main cylinder 3 as shown in FIGS. 19 and 20 thus preventing continued extension of the snubber plates 116 with the main piston 6 and retaining ring 111. Continued movement of the retaining ring relative to the snubber plates results in the substantial closing off of the oil flow slots 125 in the snubber plates at the lower ends thereof by the retaining ring thus to restrict flow therethrough, which slows extension of the gear to reduce the shock on the gear as the gear reaches the fully extended position. The slots 125 in the snubber plates may have narrow extensions 128 at the lower ends thereof which still remain open when the major width of the slots 125 is closed by the retaining ring as best seen in FIG. 20 to provide for continued restricted flow past the retaining ring. Alternatively, the retaining ring itself may contain a separate restricted orifice 130 through which the oil may still pass after the flow slots 125 in the snubber plates are substantially closed.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. A landing gear mechanism comprising a main cylinder, a main strut piston axially movable within said main cylinder, means for controlling the rate of instroke of said main strut piston within said main cylinder including restrictor means defining with the outboard end of said main strut piston a lower piston chamber therebetween, said restrictor means having a restricted flow passage therethrough for controlling the rate of flow of hydraulic fluid between said lower piston chamber and the opposite side of said restrictor means, overload relief valve means for relieving excess pressure from said lower piston chamber in the event that an overpressure condition should develop during instroke movements of said landing gear mechanism while taxiing, and means for blocking communication between said overload relief valve means and said lower piston chamber during landing, said means for blocking communication between said overload relief valve means and said lower piston chamber comprising a rotary valve vane movable between a first position covering said overload relief valve means during landing and a second position uncovering said overload relief valve means after landing has taken place.

2. A landing gear mechanism comprising a main cylinder, a main strut piston axially movable within said main cylinder, means for controlling the rate of instroke of said main strut piston within said main cylinder comprising restrictor means defining with the outboard end of said main strut piston a lower piston chamber therebetween, said restrictor means having a restricted flow passage therethrough for controlling the rate of flow of hydraulic fluid between said lower piston chamber and the opposite side of said restrictor means, and means for providing a bypass flow path for hydraulic fluid from said lower piston chamber to the opposite side of said restrictor means whenever said landing gear mechanism engages a bump during taxiing to reduce the damping loads that would otherwise occur if all such hydraulic fluid were required to pass through said restricted flow passage, said means for providing a bypass flow path comprising a bypass passage around said restricted flow passage, and means for opening said bypass passage as soon as pressure equilibrium is established within said landing gear mechanism on opposite sides of said restricted flow passage after landing to permit sudden compression of said landing gear mechanism for faster instroke as necessitated by said landing gear mechanism going over bumps and the like, said means for opening said bypass passage comprising a rotary valve vane movable between a first position closing said bypass passage and a second position opening said bypass passage, and means for moving said rotary valve vane from said first position to said second position after said landing gear mechanism has been partially compressed after landing.

3. The landing gear mechanism of claim 2 further comprising a pressure actuated valve means for blocking fluid flow through said bypass passage when said landing gear mechanism is fully extended and for permitting fluid flow through said bypass passage after landing has taken place.

4. The landing gear mechanism of claim 3 further comprising spring means for urging said pressure actuated valve means out of the path of said bypass passage, said pressure actuated valve means having a valve port which when open to the hydraulic fluid in said lower piston chamber during landing causes said pressure actuated valve means to move into the path of said bypass passage in opposition to said spring means, said rotary valve vane when moved between said first and second positions also respectively opening and closing said valve port to the hydraulic fluid in said lower piston chamber.

5. The landing gear mechanism of claim 4 further comprising a radial slot extending radially outwardly from said valve port beyond said rotary valve vane when in said second position closing said valve port to permit restricted flow of hydraulic fluid from said valve port to said lower piston chamber after such pressure equilibrium has been established to permit movement of said pressure actuated valve means out of the path of said bypass passage.

6. The landing gear mechanism of claim 4 further comprising restrictor means in said valve port for causing delayed movement of said pressure actuated valve means into the path of said bypass passage after said valve port has been opened by movement of said rotary valve vane to said first position.

7. The landing gear mechanism of claim 2 further comprising a rebound flapper valve at the end of said bypass passage opposite said lower piston chamber, said rebound flapper valve being movable away from said bypass passage to permit unrestricted flow through said bypass passage during instroke movements of said landing gear mechanism while taxiing, and being movable towards said bypass passage to restrict the flow through said bypass passage during outstroke movements of said landing gear mechanism while taxiing to dampen the outstroke of said landing gear mechanism when weighted for normal bounce during taxiing.

8. The landing gear mechanism of claim 7 wherein said rebound flapper valve when moved towards said bypass passage still provides a restricted flow passage to said bypass passage.

9. The landing gear mechanism of claim 2 further comprising overload relief valve means for relieving excess pressure from said lower piston chamber in the event that an overpressure condition should develop during instroke movements of said landing gear mechanism while taxiing.

10. The landing gear mechanism of claim 2 wherein said main strut piston includes a net annular surface area which is acted upon by the air pressure in said main cylinder tending to outstroke said main strut piston, said surface area being large enough to accelerate the upsprung mass of said landing gear mechanism into a hole but too small to lift the supported weight of the aircraft, and anticavitation means for preventing cavitation in said lower piston chamber during sudden outstroking of said landing gear mechanism into a hole.

11. The landing gear mechanism of claim 2 wherein said restrictor means comprises a restrictor orifice assembly supported by said main cylinder within said main strut piston against axial movement relative to said main cylinder, said restrictor orifice assembly defining with the outboard end of said main strut piston said lower piston chamber therebetween, said restrictor orifice assembly having an opening therethrough, a metering pin assembly attached to said main strut piston for movement therewith, said metering pin assembly including a metering pin extending through said opening defining an orifice therebetween for controlling the rate of flow of hydraulic fluid between said lower piston chamber and the opposite side of said restrictor orifice assembly, said means for moving said rotary valve vane comprising a ramp on said metering pin, and roller means operatively connected to said rotary valve vane, said roller means being engageable with said ramp when said landing gear mechanism is fully extended to move said rotary valve vane to said first position closing said bypass passage and being disengageable from said ramp after landing has taken place to move said rotary valve vane to said second position opening said bypass passage.

12. A landing gear mechanism comprising a main cylinder, a main strut piston axially movable within said main cylinder, means for controlling the rate of instroke of said main strut piston within said main cylinder, and means for dampening the outstroke of said landing gear mechanism as said landing gear mechanism reaches its fully extended position during take-off to reduce shock loads in said landing gear mechanism, said means for dampening comprising a retaining ring between said main strut piston and main cylinder, means mounting said retaining ring on the outer surface of said main strut piston for movement therewith, said retaining ring having a plurality of longitudinal grooves in the radial outer surface thereof, and snubber plates axially movable within said grooves between a first position in which hydraulic fluid is permitted to readily flow through said grooves during the majority of the outstroke of said landing gear mechanism during take-off and a second position restricting such flow through said grooves as the landing gear mechanism approaches its fully extended position.

13. The landing gear mechanism of claim 12 wherein said snubber plates have longitudinal slots therein of a length greater than the length of said grooves in said retaining ring, said snubber plates when in said first position permitting flow of hydraulic fluid into said grooves through opposite ends of said slots which extend beyond the ends of said grooves, and said snubber plates when in said second position substantially restricting the flow of hydraulic fluid into said grooves through the lower ends of said slots.

14. The landing gear mechanism of claim 13 wherein said slots in said snubber plates have extensions at the lower ends thereof through which restricted flow is permitted when said snubber plates are in said second position.

15. The landing gear mechanism of claim 14, further comprising spring means for biasing said snubber plates towards said first position for movement of said snubber plates with said retaining ring during the majority of the outstroke of said landing gear mechanism during take-off, and stop means for restraining said snubber plates against further movement with said retaining ring when said landing gear mechanism approaches its fully extended position.

16. The landing gear mechanism of claim 15 wherein said stop means comprises a bearing adjacent the outboard end of said main cylinder.

17. The landing gear mechanism of claim 13 further comprising a restricted orifice in said retaining ring through which hydraulic fluid may pass from one side of said retaining ring to the other after said grooves in said retaining ring are substantially closed by said snubber plates as said landing gear mechanism approaches its fully extended position during take-off.

18. A landing gear mechanism comprising a main cylinder, a main strut piston axially movable within said main cylinder, means for controlling the rate of instroke of said main strut piston within said main cylinder, means for setting the air spring load range of said landing gear mechanism to provide a load setting for said landing gear mechanism while in the static condition prior to take-off, and means for altering the air spring load range of said landing gear mechanism after take-off to provide a lighter load setting for said landing gear mechanism for landing, said means for altering the air spring load rnage of said landing gear mechanism after take-off comprises a hydraulic actuator within said landing gear mechanism, said hydraulic actuator comprising a hydraulic piston axially movable within said main cylinder, said hydraulic piston having one side exposed to an air chamber within said main cylinder between said hydraulic piston and the outboard end of said main strut piston, and having the other side exposed to a hydraulic chamber between said hydraulic piston and the head end of said main cylinder, means for introducing hydraulic fluid into said hydraulic chamber to move said hydraulic piston away from said head end of said main cylinder for reducing the length of said air chamber while said landing gear mechanism is in the static position prior to take-off, and means for removing hydraulic fluid from said hydraulic chamber after take-off to permit movement of said hydraulic piston toward the head end of said main cylinder by the air pressure in said air chamber acting on said hydraulic piston to increase the length of said air chamber to establish a lighter load setting for said landing gear mechanism after take-off.

19. The landing gear mechanism of claim 18 further comprising a secondary piston in said main cylinder between said hydraulic piston and the outboard end of said main strut piston, said secondary piston cooperating with said hydraulic piston to define said air chamber therebetween, and means for supplying air pressure to said air chamber.

20. The landing gear mechanism of claim 19 wherein there is another air chamber within said main cylinder between said secondary piston and the outboard end of said main strut piston, and means for supplying air pressure and hydraulic fluid to said another chamber.

21. The landing gear mechanism of claim 20 wherein said means for controlling the rate of instroke of said main strut piston within said main cylinder comprises a restrictor orifice assembly at the outboard end of said another chamber, said restrictor orifice assembly defining with the outboard end of said main strut piston a lower piston chamber therebetween, said restrictor orifice assembly having an opening therethrough, and a metering pin assembly attached to said main strut piston for movement therewith, said metering pin assembly including a metering pin extending through said opening in said restrictor orifice assembly defining an orifice therebetween for controlling the rate of flow of hydraulic fluid to and from said lower piston chamber.

22. The landing gear mechanism of claim 21 further comprising means for providing for increased flow of hydraulic fluid from said lower piston chamber to said another chamber whenever said landing gear mechanism engages a bump during taxiing to reduce the damping loads that would otherwise occur if all of such hydraulic fluid were required to pass through said orifice.

23. The landing gear mechanism of claim 22 wherein said means providing for increased flow of hydraulic fluid from said lower piston chamber comprises a bypass passage around said orifice, and means for opening said bypass passage as soon as pressure equilibrium is established within said landing gear mechanism on opposite sides of said restrictor orifice assembly after landing to permit sudden compression of said landing gear mechanism for faster instroke as necessitated by said landing gear mechanism going over bumps.

24. The landing gear mechanism of claim 23 wherein said means for opening said bypass passage comprises a rotary valve vane movable between a first position closing said bypass passage and a second position opening said bypass passage, and means for moving said rotary valve vane from said first position to said second position after said landing gear mechanism has been partially compressed after landing.

25. The landing gear mechanism of claim 24 wherein said means for moving said rotary valve vane comprises a ramp on said metering pin, and roller means operatively connected to said rotary valve vane, said roller means being engageable with said ramp when said landing gear mechanism is fully extended to move said rotary valve vane to said first position closing said bypass passage and being disengageable from said ramp after landing has taken place to move said rotary valve vane to said second position opening said bypass passage.

26. The landing gear mechanism of claim 25 further comprising a pressure actuated valve means for blocking fluid flow through said bypass passage when said landing gear mechanism is fully extended and for permitting fluid flow through said bypass passage after landing has taken place.

27. The landing gear mechanism of claim 26 further comprising spring means for urging said pressure actuated valve means out of the path of said bypass passage, said pressure actuated valve means having a valve port which when open to the hydraulic fluid in said lower piston chamber during landing causes said pressure actuated valve means to move into the path of said bypass passage in opposition to said spring means, said rotary valve vane when moved between said first and second positions also respectively opening and closing said valve port to the hydraulic fluid in said lower piston chamber.

28. The landing gear mechanism of claim 27 further comprising a radial slot extending radially outwardly from said valve port beyond said rotary valve vane when in said second position closing said valve port to permit restricted flow of hydraulic fluid from said valve port to said lower piston chamber after such pressure equilibrium has been established to permit movement of said pressure actuated valve means out of the path of said bypass passage.

29. The landing gear mechanism of claim 28 wherein said bypass passage and pressure actuated valve means are contained within said restrictor orifice assembly.

30. The landing gear mechanism of claim 27 further comprising restrictor means in said valve port for causing delayed movement of said pressure actuated valve means into the path of said bypass passage after said valve port has been opened by movement of said rotary valve vane to said first position.

31. The landing gear mechanism of claim 23 further comprising a rebound flapper valve at the end of said bypass passage opposite said lower piston chamber, said rebound flapper valve being movable away from said bypass passage to permit unrestricted flow through said bypass passage during instroke movements of said landing gear mechanism while taxiing, and being movable towards said bypass passage to restrict the flow through said bypass passage during outstroke movements of said landing gear mechanism while taxiing to dampen the outstroke of said landing gear mechanism when weighted for normal bounce during taxiing.

32. The landing gear mechanism of claim 31 wherein said rebound flapper valve when moved towards said bypass passage still provides a restricted flow passage to said bypass passage.

33. The landing gear mechanism of claim 18 wherein said main strut piston has a net annular surface area which is acted upon by the air pressure within said main cylinder tending to outstroke said landing gear mechanism, said surface area being large enough to accelerate the unsprung mass of said main strut piston into a hole but being too small to lift the supported weight of the aircraft supported thereby.

34. The landing gear mechanism of claim 21 further comprising check valve means for supplementing the flow of hydraulic fluid to said lower piston chamber during the outstroke of said landing gear mechanism during taxiing.

35. The landing gear mechanism of claim 34 wherein said check valve means is contained within said restrictor orifice assembly.

36. The landing gear mechanism of claim 21 further comprising overload relief valve means for relieving excess pressure from said lower piston chamber in the event that an overpressure condition should develop during instroke movements of said landing gear mechanism while taxiing.

37. The landing gear mechanism of claim 36 further comprising means for blocking communication between said overload relief valve means and said lower piston chamber during landing.

38. The landing gear mechanism of claim 37 wherein said means for blocking communication between said overload relief valve means and said lower piston chamber comprises said rotary valve vane which covers said overload relief valve means when in said first position.

39. The landing gear mechanism of claim 21 wherein said main strut piston includes a net annular surface area which is acted upon by the air pressure in said main cylinder tending to outstroke said main strut piston, said surface area being large enough to accelerate the unsprung mass of said landing gear mechanism into a hole but too small to lift the supported weight of the aircraft, and anticavitation means for preventing cavitation in said lower piston chamber during sudden outstroking of said landing gear mechanism into a hole.

40. The landing gear mechanism of claim 39 wherein said anticavitation means comprises a bypass sleeve valve axially movable within said metering pin, said bypass sleeve valve and metering pin each having a plurality of axially spaced holes therein which may be brought into and out of alignment with each other upon moving said bypass sleeve valve in opposite directions, said holes when in alignment with each other allowing for flow of hydraulic fluid through said bypass sleeve valve around said orifice to supplement the flow of hydraulic fluid through said orifice to said lower piston chamber, means for moving said bypass sleeve valve to a first position in which said holes are out of alignment with each other whenever the hydraulic fluid pressure in said lower piston chamber is below a predetermined level and for moving said bypass sleeve valve to a second position in which said holes are in alignment with each other whenever the hydraulic fluid pressure in said lower piston chamber drops below such predetermined level.

41. The landing gear mechanism of claim 40 wherein said means for moving said bypass sleeve valve comprises a spring urging said bypass sleeve valve to said second position, and a differential surface area on said bypass sleeve valve acted upon by the hydraulic fluid pressure in said lower piston chamber to move said bypass sleeve valve to said first position only when the hydraulic fluid pressure in said lower piston chamber is above such predetermined level.

42. The landing gear mechanism of claim 40 further comprising check valve means for allowing for flow of hydraulic fluid through the center of said metering pin during the instroke of said landing gear mechanism and for blocking such flow through said metering pin when said landing gear mechanism suddenly starts to outstroke into a hole to keep hydraulic fluid inside said metering pin and prevent trapped vapors from entering said metering pin during such sudden outstroke of said landing gear mechanism.

43. The landing gear mechanism of claim 18 further comprising rebound damper means for dampening the outstroke of said landing gear mechanism as said landing gear mechanism reaches its fully extended position during take-off to reduce shock loads in said landing gear mechanism.

44. The landing gear mechanism of claim 18 wherein said means for controlling the rate of instroke of said main strut piston within said main cylinder comprises restrictor means defining with the outboard end of said main strut piston a lower piston chamber therebetween, said restrictor means having a restricted flow passage therethrough for controlling the rate of flow of hydraulic fluid between said lower piston chamber and the opposite side of said restrictor means.

45. The landing gear mechanism of claim 44 further comprising means for providing a bypass flow path for hydraulic fluid from said lower piston chamber to the opposite side of said restrictor means whenever said landing gear mechanism engages a bump during taxiing to reduce the damping loads that would otherwise occur if all such hydraulic fluid were required to pass through said restricted flow passage.

46. The landing gear mechanism of claim 45 wherein said means for providing a bypass fluid path comprises a bypass passage around said restricted flow passage, and means for opening said bypass passage as soon as pressure equilibrium is established within said landing gear mechanism on opposite sides of said restricted flow passage after landing to permit sudden compression of said landing gear mechanism for faster instroke as necessitated by said landing gear mechanism going over bumps.

47. A landing gear mechanism comprising a main cylinder, a main strut piston axially movable within said main cylinder, means for controlling the rate of instroke of said main strut piston within said main cylinder, means for setting the air spring load range of said landing gear mechanism to provide a load setting for said landing gear mechanism while in the static condition prior to take-off, means for altering the air spring load range of said landing gear mechanism after take-off to provide a lighter load setting for said landing gear mechanism for landing, and rebound damper means for dampening the outstroke of said landing gear mechanism as said landing gear mechanism reaches its fully extended position during take-off to reduce shock loads in said landing gear mechanism, said rebound damper means comprising a retaining ring between said main strut piston and main cylinder, means mounting said retaining ring on the outer surface of said main strut piston for movement therewith, said retaining ring having a plurality of longitudinal grooves in the radial outer surface thereof, and snubber plates axially movable within said grooves between a first position in which hydraulic fluid is permitted to readily flow through said grooves during the majority of the outstroke of said landing gear mechanism during take-off and a second position restricting such flow through said grooves as the landing gear mechanism approaches its fully extended position.

48. The landing gear mechanism of claim 47 wherein said snubber plates have longitudinal slots therein of a length greater than the length of said grooves in said retaining ring, said snubber plates when in said first position permitting flow of hydraulic fluid into said grooves through opposite ends of said slots which extend beyond the ends of said grooves, and said snubber plates when in said second position substantially restricting the flow of hydraulic fluid into said grooves through the lower ends of said slots.

49. The landing gear mechanism of claim 48 wherein said slots in said snubber plates have extensions at the lower ends thereof through which restricted flow is permitted when said snubber plates are in said second position.

50. The landing gear mechanism of claim 49 further comprising spring means for biasing said snubber plates towards said first position for movement of said snubber plates with said retaining ring during the majority of the outstroke of said landing gear mechanism during take-off, and stop means for restraining said snubber plates against further movement with said retaining ring when said landing gear mechanism approaches its fully extended position.

51. The landing gear mechanism of claim 50 wherein said stop means comprises a bearing adjacent the outboard end of said main cylinder.

52. The landing gear mechanism of claim 48 further comprising a restricted orifice in said retaining ring through which hydraulic fluid may pass from one side of said retaining ring to the other after said grooves in said retaining ring are substantially closed by said snubber plates as said landing gear mechanism approaches its fully extended position during take-off.

53. A landing gear mechanism comprising a main cylinder, a main strut piston axially movable within said main cylinder, and means for controlling the rate of instroke of said main strut piston within said main cylinder comprising a restrictor orifice assembly supported by said main cylinder within said main strut piston against axial movement relative to said main cylinder, said restrictor orifice assembly defining with the outboard end of said main strut piston a lower piston chamber therebetween, said restrictor orifice assembly having an opening therethrough, a metering pin assembly attached to said main strut piston for movement therewith, said metering pin assembly including a metering pin extending through said opening defining an orifice therebetween for controlling the rate of flow of hydraulic fluid between said lower piston chamber and the opposite side of said restrictor orifice assembly, and means for providing a bypass flow path for hydraulic fluid from said lower piston chamber to the opposite side of said restrictor orifice assembly whenever said landing gear mechanism engages a bump during taxiing to reduce the damping loads that would otherwise occur if all such hydraulic fluid were required to pass through said orifice, said means for providing a bypass flow path comprising a bypass passage around said orifice, and means for opening said bypass passage as soon as pressure equilibrium is established within said landing gear mechanism on opposite sides of said orifice after landing to permit sudden compression of said landing gear mechanism for faster instroke as necessitated by said landing gear mechanism going over bumps, said means for opening said bypass passage comprising a rotary valve vane movable between a first position closing said bypass passage and a second position opening said bypass passage, and means for moving said rotary valve vane from said first position to said second position after said landing gear mechanism has been partially compressed after landing.

54. The landing gear mechanism of claim 53, wherein said means for moving said rotary valve vane comprises a ramp on said metering pin, and roller means operatively connected to said rotary valve vane, said roller means being engageable with said ramp when said landing gear mechanism is fully extended to move said rotary valve vane to said first position closing said bypass passage and being disengageable from said ramp after landing has taken place to move said rotary valve vane to said second position opening said bypass passage.

55. The landing gear mechanism of claim 54 further comprising a pressure actuated valve means for blocking fluid flow through said bypass passage when said landing gear mechanism is fully extended and for permitting fluid flow through said bypass passage after landing has taken place.

56. The landing gear mechanism of claim 55 further comprising spring means for urging said pressure actuated valve means out of the path of said bypass passage, said pressure actuated valve means having a valve port which when open to the hydraulic fluid in said lower piston chamber during landing causes said pressure actuated valve means to move into the path of said bypass passage in opposition to said spring means, said rotary valve vane when moved between said first and second positions also respectively opening and closing said valve port to the hydraulic fluid in said lower piston chamber.

57. The landing gear mechanism of claim 56 further comprising a radial slot extending radially outwardly from said valve port beyond said rotary valve vane when in said second position closing said valve port to permit restricted flow of hydraulic fluid from said valve port to said lower piston chamber after such pressure equilibrium has been established to permit movement of said pressure actuated valve means out of the path of said bypass passage.

58. The landing gear mechanism of claim 57 wherein said bypass passage and pressure actuated valve means are contained within said restrictor orifice assembly.

59. The landing gear mechanism of claim 56 further comprising restrictor means in said valve port for causing delayed movement of said pressure actuated valve means into the path of said bypass passage after said valve port has been opened by movement of said rotary valve vane to said first position.

60. The landing gear mechanism of claim 53 further comprising a rebound flapper valve at the end of said bypass passage opposite said lower piston chamber, said rebound flapper valve being movable away from said bypass passage to permit unrestricted flow through said bypass passage during instroke movements of said landing gear mechanism while taxiing, and being movable towards said bypass passage to restrict the flow through said bypass passage during outstroke movements of said landing gear mechanism while taxiing to dampen the outstroke of said landing gear mechanism when weighted for normal bounce during taxiing.

61. The landing gear mechanism of claim 53 further comprising overload relief valve means for relieving excess pressure from said lower piston chamber in the event that an overpressure condition should develop during instroke movements of said landing gear mechanism while taxiing.

62. The landing gear mechanism of claim 53 wherein said main strut piston includes an annular surface area which is acted upon by the air pressure in said main cylinder tending to outstroke said main strut piston, said surface area being large enough to accelerate the unsprung mass of said landing gear mechanism into a hole but too small to lift the supported weight of the aircraft, and anticavitation means for preventing cavitation in said lower piston chamber during sudden outstroking of said landing gear mechanism into a hole.

63. A landing gear mechanism comprising a main cylinder, a main strut piston axially movable within said main cylinder, and means for controlling the rate of instroke of said main strut piston within said main cylinder comprising a restrictor orifice assembly supported by said main cylinder within said main strut piston against axial movement relative to said main cylinder, said restrictor orifice assembly defining with the outboard end of said main strut piston a lower piston chamber therebetween, said restrictor orifice assembly having an opening therethrough, a metering pin assembly attached to said main strut piston for movement therewith, said metering pin assembly including a metering pin extending through said opening defining an orifice therebetween for controlling the rate of flow of hydraulic fluid between said lower piston chamber and the opposite side of said restrictor orifice assembly, means for providing a bypass flow path for hydraulic fluid from said lower piston chamber to the opposite side of said restrictor orifice assembly whenever said landing gear mechanism engages a bump during taxiing to reduce the damping loads that would otherwise occur if all such hydraulic fluid were required to pass through said orifice, said means for providing a bypass flow path comprising a bypass passage around said orifice, and means for opening said bypass passage as soon as pressure equilibrium is established within said landing gear mechanism on opposite sides of said orifice after landing to permit sudden compression of said landing gear mechanism for faster instroke as necessitated by said landing gear mechanism going over bumps, and a rebound flapper valve at the end of said bypass passage opposite said lower piston chamber, said rebound flapper valve being movable away from said bypass passage to permit unrestricted flow through said bypass passage during instroke movements of said landing gear mechanism while taxiing, and being movable towards said bypass passage to restrict the flow through said bypass passage during outstroke movements of said landing gear mechanism while taxiing to dampen the outstroke of said landing gear mechanism when weighted for normal bounce during taxiing, said rebound flapper valve when moved towards said bypass passage still providing a restricted flow passage to said bypass passage.

64. A landing gear mechanism comprising a main cylinder, a main strut piston axially movable within said main cylinder, and means for controlling the rate of instroke of said main strut piston within said main cylinder comprising a restrictor orifice assembly supported by said main cylinder within said main strut piston against axial movement relative to said main cylinder, said restrictor orifice assembly defining with the outboard end of said main strut piston a lower piston chamber therebetween, said restrictor orifice assembly having an opening therethrough, a metering pin assembly attached to said main strut piston for movement therewith, said metering pin assembly including a metering pin extending through said opening defining an orifice therebetween for controlling the rate of flow of hydraulic fluid between said lower piston chamber and the opposite side of said restrictor orifice assembly, and means for providing a bypass flow path for hydraulic fluid from said lower piston chamber to the opposite side of said restrictor orifice assembly whenever said landing gear mechanism engages a bump during taxiing to reduce the damping loads that would otherwise occur if all such hydraulic fluid were required to pass through said orifice, said main strut piston including an annular surface area which is acted upon by the air pressure in said main cylinder tending to outstroke said main strut piston, said surface area being large enough to accelerate the unsprung mass of said landing gear mechanism into a hole but too small to lift the supported weight of the aircraft, and anticavitation means for preventing cavitation in said lower piston chamber during sudden outstroking of said landing gear mechanism into a hole, said anticavitation means comprising a bypass sleeve valve axially movable within said metering pin, said bypass sleeve valve and metering pin each having a plurality of axially spaced holes therein which may be brought into and out of alignment with each other upon moving said bypass sleeve valve in opposite directions, said holes when in alignment with each other allowing for flow of hydraulic fluid through said bypass sleeve valve around said orifice to supplement the flow of hydraulic fluid through said orifice to said lower piston chamber, means for moving said bypass sleeve valve to a first position in which said holes are out of alignment with each other whenever the hydraulic fluid pressure in said lower piston chamber is below a predetermined level and for moving said bypass sleeve valve to a second position in which said holes are in alignment with each other whenever the hydraulic fluid pressure in said lower piston chamber drops below such predetermined level.

65. The landing gear mechanism of claim 64 wherein said means for moving said bypass sleeve valve comprises a spring urging said bypass sleeve valve to said second position, and a differential surface area on said bypass sleeve valve acted upon by the hydraulic fluid pressure in said lower piston chamber to move said bypass sleeve valve to said first position only when the hydraulic fluid pressure in said lower piston chamber is above such predetermined level.

66. The landing gear mechanism of claim 64 further comprising check valve means for allowing for flow of hydraulic fluid through the center of said metering pin during the instroke of said landing gear mechanism and for blocking such flow through said metering pin when said landing gear mechanism suddenly starts to outstroke into a hole to keep hydraulic fluid inside said metering pin and prevent trapped vapors from entering said metering pin during such sudden outstroke of said landing gear mechanism.

* * * * *